United States Patent
Peters et al.

(10) Patent No.: US 12,273,218 B2
(45) Date of Patent: Apr. 8, 2025

(54) CONTROL UNIT

(71) Applicant: Robert Bosch GmbH, Stuttgart (DE)

(72) Inventors: Matthias Peters, Obersulm (DE); Richard Heidemann, Langenbrettbach (DE); Roman Walther, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/265,729

(22) PCT Filed: Sep. 18, 2019

(86) PCT No.: PCT/EP2019/075090
§ 371 (c)(1),
(2) Date: Feb. 3, 2021

(87) PCT Pub. No.: WO2020/083577
PCT Pub. Date: Apr. 30, 2020

(65) Prior Publication Data
US 2021/0176088 A1 Jun. 10, 2021

(30) Foreign Application Priority Data
Oct. 25, 2018 (DE) .......................... 102018218257.4

(51) Int. Cl.
*H04L 12/40* (2006.01)
*B60W 50/00* (2006.01)
(Continued)

(52) U.S. Cl.
CPC ....... *H04L 12/40013* (2013.01); *B60W 50/02* (2013.01); *H04L 41/0813* (2013.01);
(Continued)

(58) Field of Classification Search
None
See application file for complete search history.

(56) References Cited

U.S. PATENT DOCUMENTS

2014/0107863 A1\* 4/2014 Ishigooka ......... H04L 12/40169
701/1
2014/0154971 A1\* 6/2014 Tanaka ..................... H04B 7/14
455/7
(Continued)

FOREIGN PATENT DOCUMENTS

DE 102005024559 A1 11/2006
DE 102011102770 A1 11/2012
EP 1858206 A1 \* 11/2007 ........... B60R 16/023

OTHER PUBLICATIONS

Luz, EP1858206 English translation, 2007, 1-5 (Year: 2007).\*
International Search Report for PCT/EP2019/075090, Issued Nov. 27, 2019.

*Primary Examiner* — Derrick W Ferris
*Assistant Examiner* — Keith Follansbee
(74) *Attorney, Agent, or Firm* — NORTON ROSE FULBRIGHT US LLP; Gerard A. Messina

(57) ABSTRACT

A control unit for a vehicle, having an interface for the exchange of data with a sensor, an actuator, and/or a processing unit, including a data memory, in which a first list with multiple first reference numbers (port) is stored. At least one datum of a sensor or an actuator is allocated to a first reference number, and a second list with second reference numbers is stored in the data memory. At least one parameter of a data transmission is stored for each second reference number, a first reference number being allocated via a modifiable allocation to a second reference number, and the control unit being developed to receive and/or
(Continued)

transmit the data of a first reference number in accordance with the parameter of the data transmission of the second reference number.

13 Claims, 2 Drawing Sheets

(51) Int. Cl.
    *B60W 50/02*     (2012.01)
    *H04L 41/00*     (2022.01)
    *H04L 41/0813*     (2022.01)

(52) U.S. Cl.
    CPC ..... *H04L 41/26* (2013.01); *B60W 2050/0045* (2013.01); *H04L 2012/40273* (2013.01)

(56) References Cited

U.S. PATENT DOCUMENTS

| | | | |
|---|---|---|---|
| 2015/0312150 A1 | 10/2015 | Brune et al. | |
| 2017/0134358 A1* | 5/2017 | Takada | H04W 12/069 |
| 2018/0162295 A1* | 6/2018 | Honda | H04L 12/28 |
| 2018/0218158 A1* | 8/2018 | Amano | H04L 12/40006 |
| 2018/0302265 A1* | 10/2018 | Atobe | H04L 67/12 |

* cited by examiner

CONTROL UNIT

FIELD

The present invention relates to a control unit for a vehicle and to a method for adjusting at least one parameter of a data transmission of the control unit.

BACKGROUND INFORMATION

In the related art, the data exchange with a control unit of a vehicle is fixedly preprogrammed.

SUMMARY

An object of the present invention is to provide a control unit which has greater flexibility in the data exchange, and a method for adjusting at least one parameter of a data transmission of a control unit for a vehicle.

The object may be achieved in accordance with example embodiment(s) of the present invention. Additional embodiments of the control unit and the present method are described herein.

One advantage of the control unit in accordance with an example embodiment of the present invention is that a first list with first reference numbers is stored in the data memory of the control unit. At least one datum of a measured value or control value of a sensor or actuator is allocated to each first reference number. In addition, a second list with second reference numbers is stored in the data memory. At least one parameter of a data transmission is allocated to each second reference number. The first reference number is able to be allocated to a second reference number in a modifiable manner.

In addition, the control unit is developed to receive and/or to transmit the data of the first reference number in accordance with the parameter of the data transmission of the second reference number. As a result, the type of data transmission of a datum is easily able to be modified.

As a result, greater flexibility of the control unit for the data exchange with other control units, sensors and/or actuators is provided. In this way, for instance, a control unit is able to be configured for a data exchange by a further control unit which uses a different type of data transmission in that the corresponding allocation of the first reference number to a corresponding second reference number takes place. This is particularly advantageous if a control unit is to be adapted to other, different control units for a data exchange. In particular, the adaptation of the data communication of the control unit may also be appropriately adapted by a user of the control unit or by a user of the vehicle at a later point in time even after the series production or also after the sale of the control unit. This approach is especially advantageous in markets where a high adaptability of the data communication of the control unit is advantageous when a high variance of vehicles with a low unit number in the markets is desired. This makes it easy to accomplish an individual configuration of the data exchange of the control unit.

In one example embodiment of the present invention, the control unit is developed to modify a specified allocation between a first reference number and a second reference number when predefined control data are received. For example, a first reference number may be allocated to a second reference number for the first time. In addition, an already existing allocation of a first reference number to a second reference number is able to be modified and the first reference number be allocated to another second reference number. With the aid of such an embodiment of the control unit, the control unit is able to be configured from the outside by the specification of corresponding control data in such a way that at least one desired parameter of the data transmission of the data of a first reference number is able to be specified or modified in an uncomplicated manner.

In a further embodiment of the present invention, the control unit is developed to implement, via the receipt of a diagnosis signal, a specification and/or a modification of an allocation between a first reference number and a second reference number. During a workshop visit, for example, a data communication of the control unit is able to be modified with the aid of a processing unit which carries out a diagnostic service on the control unit. Depending on the selected embodiment, the control unit may have a separate connection for connecting the processing unit for the diagnostic service. When visiting a workshop, for instance during a service call, the data communication of the control unit for transmitting and/or receiving of data is easily able to be changed or adapted in this way.

In a further embodiment of the present invention, the second reference number has at least one of the following parameters for the predefined data transmission: the type of network frame, the start bit for the data frame, the type of network, and the resolution of the network. These parameters of the data transmission are not complete and it is therefore also possible that other parameters of the data transmission are allocated to a second reference number. The type of data transmission for the data of a correspondingly allocated first reference number is able to be determined by the specification of at least one parameter for the data transmission. The type of used parameter also depends on the type of network used.

In one embodiment of the present invention, a first reference number has at least one of the following features: a transmission direction, a data type, a data name, and a data accuracy. These features are not complete but merely serve as examples. With the aid of these features the data that are allocated to the first reference number are able to be described more precisely.

In one further embodiment of the present invention, the first reference numbers and the allocated data are stored in an area of the data memory that is protected from changes so that the first reference numbers and the allocated data are unable to be modified by an external control command. In particular, the first reference numbers and the allocated data are protected from a modification by a control command of a processing unit of a diagnostic service. In contrast thereto, the second reference numbers are stored in an area of the memory that is modifiable via external control signals. As a result, both the second reference numbers and the parameters of the data transmission allocated to the second reference numbers are able to be modified by an external control signal. More specifically, the second reference numbers and the parameters of the data transmission allocated to the second reference numbers are able to be modified via external control signals of a processing unit, which carries out a diagnostic service of the control unit. A simple modification and adaptation of the type of data communication of the control unit is therefore possible.

In one embodiment of the present invention, at least a portion of the first reference numbers is allocated to a data port of a data protocol in each case. The control unit is developed to receive the data of a first reference number via the allocated data port of the data protocol and/or to transmit the data of a first reference number via the allocated data port of the data protocol. In this way a simple adaptation of the data transmission of data of a specified data port of a data protocol is able to be achieved.

In accordance with an example embodiment of the present invention, a method is provided for adjusting at least one parameter of a data transmission of a control unit for a vehicle. The control unit has an interface for the exchange of data from a sensor or an actuator with a processing unit, in particular with a further control unit. A first list with multiple first reference numbers is stored in the data memory of the control unit. In addition, at least one datum of a sensor or an actuator is allocated to a first reference number in each case. Furthermore, a second list with second reference numbers is stored in the data memory. At least one parameter of a predefined data transmission is allocated to the second reference numbers. Upon receipt of a predefined control command, a reference number is allocated to a second reference number in each case. The data of a first reference number are received and/or transmitted in accordance with the allocated second reference number using the parameter of the data transmission of the allocated second reference number. A simple and practical method for modifying a data transmission of data of the control unit is obtained in this way.

In one embodiment of the present invention, a type of monitoring of the data transmission is able to be modified as well. Not only the actual data transmission but also its monitoring is able to be reconfigured. Monitoring mechanisms of data and/or signals from different control units can lead to incompatibilities in the vehicle bus. For example, if the output period of a signal was modified because a new sensor was used, then a non-adapted monitoring may regularly lead to error entries in control units, which then degrade their function or switch off altogether. Also, ageing manifestations in sensors or actuators, for instance, may make it necessary to soften certain monitoring limits.

Exemplary embodiments of the present invention are described in greater detail below with the aid of the figures.

DETAILED DESCRIPTION OF EXAMPLE EMBODIMENTS

Figure 1:
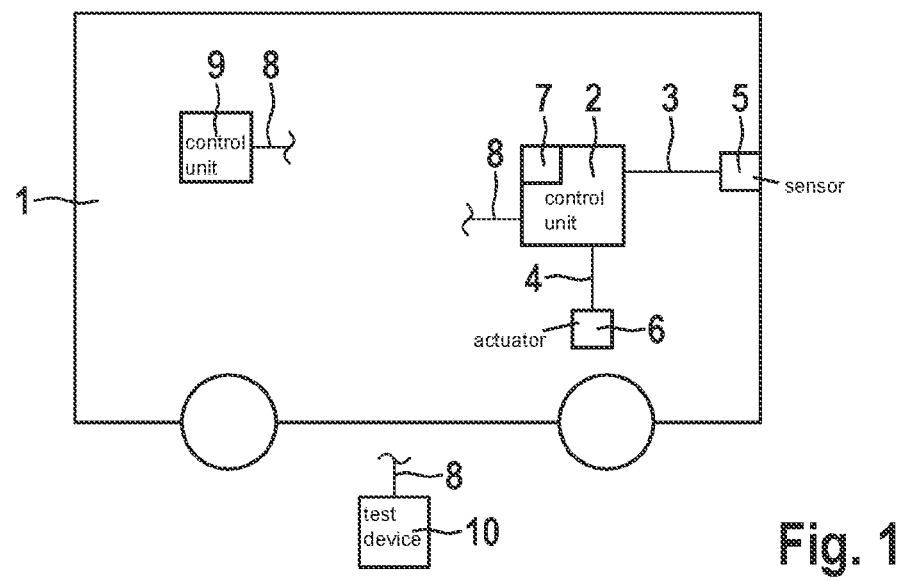
FIG. 1 shows a schematic representation of a vehicle having a control unit and an external control unit, in accordance with an example embodiment of the present invention.

FIG. 1 shows in a schematic representation a vehicle 1, which has a control unit 2. Control unit 2 is connected via data and control lines 3, 4 to at least one sensor 5 and/or at least one actuator 6. For example, sensor 5 may be a speed sensor for sensing the speed of the vehicle. Actuator 6 may be provided for actuating a brake of the vehicle, for instance. A vehicle should be understood to include any type of vehicle, in particular vehicles movable on water, vehicles movable on land, or vehicles movable in the air. For example, a vehicle is understood as an airplane, a car but also a movable construction machine or an agricultural machine equipped with its own drive in each case.

In addition, control unit 2 has a data memory 7. Data and/or programs required by control unit 2 in order to carry out the allocated tasks are able to be stored in data memory 7. In particular, control unit 2 may be designed to actuate actuator 6 according to an operating state of vehicle 1 or of a drive of vehicle 1. In addition, control unit 2 may be designed to acquire and store measured values of sensor 5. In addition, control unit 2 has an interface 8 via which the data are exchanged with a processing unit, in particular with a further control unit 9 of vehicle 1 or with an external control unit. Interface 8 moreover is designed to exchange data with a processing unit in the form of a test device 10 for a diagnosis of control unit 2. Test device 10 for the diagnosis of the control unit is situated outside vehicle 1 and normally is used for reading out data from control unit 2, in particular for exchanging data with control unit 2, when servicing of vehicle 1 takes place.

Depending on the selected embodiment, at least one sensor and/or at least one actuator is/are able to communicate with control unit 2 via interface 8. A data protocol, in particular a network protocol, is used for a communication via interface 8. For example, the data protocol is able to be developed as a CAN-bus data protocol. Other data protocols are usable as well, however. Additional networks such as the Ethernet are also able to be used for the communication between two control units of a vehicle via interface 8. However, networks such as LIN, MOST or FlexRay can be used as well. It is possible to utilize network protocols that are set up according to what is known as a TCP/IP reference model in four layers built on top of one another. For example, Ethernet can be used as the hardware, DOIP (ISO 13400) as a transport protocol, and UDS (ISO 14229) may be used as a diagnosis protocol. In addition, for example, a CAN bus is able to be used as a network and ISO-TP (according to the ISO standard 15765-2) as the transport protocol, and ISO-OBD (according to ISO standard 15031) can be used as the diagnosis protocol. Each one of these data protocols may have a different data structure, in particular different network frames, a different position of the start bit for the useful signal, a different network type, and a different network resolution as well as different data ports for specified data.

Provided control unit 2 has the advantage of allowing for a modification of the type of data transmission. For example, this may be carried out with the aid of a test device 10 for a diagnosis of control unit 2.

Figure 2:
FIG. 2 shows a schematic representation of a first list with first reference numbers and a second list with second reference numbers, in accordance with an example embodiment of the present invention.

As illustrated in FIG. 2, for instance, control unit 2 has a first list 100. First reference numbers are provided in a first column 110 of first list 100. In first column 110 in FIG. 2, for instance, first reference numbers 1, 2, 3, 4, 5, 6, etc. are listed in succession. At least one parameter of the datum is allocated to each first reference number. More specifically, the first reference numbers represent the data ports at which control unit 2 transmits the corresponding data in the data protocol. For example, a second column 120, a third column 130, a fourth column 140, and a fifth column 150 are provided in first list 100. In second column 120, for instance, the transmission direction is specified. The transmission direction specifies whether the data are transmitted or received. In the proposed example, it is stipulated by RX that the data are received. In addition, the designation TX specifies that the data are transmitted. The data are stored in third column 130. For instance, N1 means the vehicle speed. N2 means the steering wheel angle, for example. N3 means the rotational speed, for instance. N4 means the sensor state, for example. N5, for instance, means zone 1, and N6 means zone 2, for instance. The data type based on which the datum is transmitted is described in fourth column 140, for example. For instance, T1 means an unsigned word. T2 means a signed word (signed long). T3 means a signed short word (unsigned short), for example.

Values for the resolution of the datum are stored in fifth column 150. The value 0.01 is listed in the first line of fifth column 150. The value 0.1, etc. is listed in the second line of fifth column 150. First list 100 is stored in data memory 7 of control unit 2.

In addition to first list 100, data memory 7 has a second list 200. Second list 200 is once again set up in the form of lines and columns. Second reference numbers are indicated in second list 200 in first column 210. For each second reference number, further information about at least one parameter of a data protocol is stored in the line of the respective second reference number. For example, information about the network frame is stored in second column 220 of second list 200. Network frame 0x305, for instance, is stored in the first line of second column 220. Network frame 0x520 is stored in the second line of second column 220. The structure of the data protocol is described with the aid of the network frame. Data bits at which the frame for the useful data transmission is started are indicated in third column 230 of second list 200. Entered in the first line of third column 230 is start bit 8. Start bit 22 is entered in the second line of third column 230 of second list 200.

Information about the network type is stored in a fourth column 240. For example, the network type signed 12 bit (s12b) is stored in the first line of fourth column 240. Stored in the second line of fourth column 240 is the network type unsigned 8 bit (us8b). Thus, the network type is uniquely specified. Information about the network resolution is stored in fifth column 250 of second list 200. For example, the value 0.25 is stored in the first line of fifth column 250. The value 1 is stored in the second line of fifth column 250.

Shown between the lines of first list 100 and second list 200 are allocation arrows 510, 520. Allocation arrows 510, 520 symbolize the type of data transmission that is used for transmitting the datum of a first reference number of first list 100. For example, first reference number 1 is allocated to the uppermost second reference number of second list 200. As a result, the data of first reference number 1 are received and/or transmitted by control unit 2 using the data transmission that is specified by the line of the uppermost second reference number of second list 200.

Second allocation arrow 520 allocates first reference number 4, i.e., in this case the data of the fourth line of first list 100, to second reference number 4, i.e., the second line of second list 200. The data of first reference number 4 are therefore received or transmitted by control unit 2 using the data transmission that is specified by the values of the second line of second list 200.

Depending on the selected embodiment, both first list 100 and second list 200 may have more or fewer columns and/or lines. The allocation which is graphically shown by allocation arrows 510, 520 is able to be modified with the aid of external control commands received from control unit 2. In addition, second list 200 may be developed in such a way that the values of the columns of second list 200 are able to be modified through the receiving of external control commands. Depending on the selected embodiment, first list 100 is blocked with regard to a modification by external control commands.

This makes it possible not only to modify the allocation of the data transmission to the reference numbers and thus to the data of first list 100 during the operation of control unit 2, but new parameters for a data transmission, in particular a data transmission protocol, are able to be inserted into second list 200. In addition, existing values of second list 200 are able to be modified.

In a further embodiment, the second list has at least one of the following parameters for the predefined data transmission: the type of network frame, the start bit for the data frame, the type of network, and the resolution of the network. These parameters of the data transmission are not complete so that it is also possible that other parameters of the data transmission are allocated to a second reference number. By the specification of at least one parameter for the data transmission, the type of data transmission for the data of a correspondingly allocated first reference number is able to be determined. The type of used parameter depends also on the type of the network used.

It is possible to adjust all parameters that would also be required in a preconfiguration. Depending on the protocol type, the parameters may differ slightly. Using the example of a CAN bus protocol, the following parameters are able to be modified:

mapping between the first and the second reference number
endianness
start bit
length
signed/unsigned
bus factor
bus offset
internal norming factor
signal conversion factor
direction (RX/TX)
period
validity range
validity monitoring timeout
frame ID.

In addition, the type of monitoring of the data transmission also may be specified in the second list. The monitoring of the data transmission is therefore able to be reconfigured as well.

The values of the first reference numbers of first column 110 of first list 100, for instance, correspond to a specified data port, which is used by control unit 2 for the receiving and transmitting of the datum. Depending on the selected embodiment, the speed of vehicle 1, for example, is able to be received via data port 1. In addition, a sensor state is able to be transmitted by control unit 2 via data port 4 to a further control unit 9 or to an external processing unit such as a test device for a diagnosis.

Figure 3:
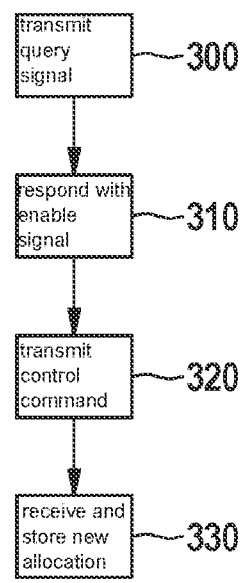
FIG. 3 shows a schematic program sequence for the configuration of a data transmission of a control unit, in accordance with an example embodiment of the present invention.

FIG. 3 shows in a schematic representation an example of a method for adjusting at least one parameter of a data transmission of a control unit 2 for a vehicle. In program point 300, test device 10 for the diagnosis transmits a query signal for starting a diagnostic service via interface 8. Upon receipt of the query, control unit 2 responds in program point 310 by an enable signal for starting the diagnosis. In a following program point 320, test device 10 for the diagnosis receives the enable signal and then transmits a control command for setting up an allocation of the first reference number of the second line of first column 110 of first list 100 to the uppermost second reference number of first column 210 of second list 200. In a following program point 330, control unit 2 receives the new allocation and stores this new allocation. In the future, control unit 2 will receive and/or transmit the data of the first reference number of the second line of first list 100 using the data protocol specified by second reference number 1 of first column 210 of second list 200.

Figure 4:
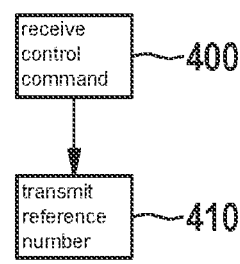
FIG. 4 shows a further embodiment for a method in which parameters for the receiving and/or transmitting of data by the control unit are modified, in accordance with an example embodiment of the present.

FIG. 4 shows a further embodiment for a method in which parameters for the receiving and/or transmitting of data are modified by control unit 2. In program point 400, control unit 2 receives a control command for modifying at least one value of second list 200. In a following program point 410, test device 10 transmits the reference number of the data of second list 200 to be modified and additionally the column whose datum is to be modified, and furthermore the new value which is to be used in second list 200 for the data transmission in place of the current value. For example, for the second reference number of the second line, which has the value 4, test device 10 transmits to control device 2 the value 0.5 for fifth column 250. As a result, control unit 2 overwrites the value 1 with the value 0.5 and uses the network resolution of 0.5 instead of the current network resolution 1 in the future for the data transmission of the second reference number of the second line. In this way, any individual parameters of the data transmission of second list 200 are able to be modified.

Furthermore, depending on the selected embodiment, a new second reference number for first column 210 with associated further data for the second, third, fourth, and/or fifth column 220, 230, 240, 250 is able to be transmitted by test device 10 to control unit 2. In this embodiment, control unit 2 stores the new received data including the corresponding second reference number and the associated values in second list 200 as a new line.

With the aid of the described method and the described device, it is possible to select and/or specify the freest configuration possible, in particular a free allocation, a free selection of a data width, a free selection of a resolution of the data protocol, and a free selection of a position of the useful data in the data protocol. A dynamic adjustment of the used data protocol is therefore able to be carried out, for instance with the aid of diagnosis commands of a test device for a diagnosis.

In addition, depending on the selected embodiment, a modification and/or a specification of new data for a data transmission to be used is also able to be specified by a second control unit of the vehicle.

Although the present invention was described in detail by the preferred exemplary embodiments, the present invention is not restricted to the described examples, and other variations thereof are able to be derived by one skilled in the art without departing from the protective scope of the present invention.

What is claimed is:

1. A control unit for a vehicle, comprising:
an interface configured for exchange of data with a sensor, an actuator, and/or a processing unit; and
a data memory in which a first list having multiple first reference numbers is stored, at least one datum of a sensor or an actuator being allocated to each of the first reference numbers, and a second list with second reference numbers being stored in the data memory, at least one parameter of a data transmission or a monitoring of the data transmission being stored for each of the second reference numbers, each of the first reference numbers being allocated via a modifiable allocation to a second reference number of the second reference numbers;
wherein the control unit is configured to receive and/or transmit the data of a first reference number of the first reference numbers in accordance with the parameter of the data transmission of the allocated second reference number, and
wherein:
the first reference number represents a data port at which the control unit transmits the data in a data protocol, and
the first reference number has a data accuracy.

2. The control unit as recited in claim 1, wherein the control unit is configured to modify the allocation between the first reference number and the second reference number when predefined control data are received.

3. The control unit as recited in claim 1, wherein the control unit is configured to implement a specification and/or a modification of the allocation between the first reference number and the second reference number after receipt of a diagnosis control command.

4. The control unit as recited in claim 1, wherein the data transmission of the second reference number has at least one of the following parameters: a network frame ID, and/or a frame start bit, and/or a network type, and/or a network resolution.

5. The control unit as recited in claim 1, wherein the first reference numbers are stored in a protected area of the memory, and the second reference numbers are stored in an area of the memory that is modifiable via external control signals.

6. The control unit as recited in claim 1, wherein the control unit is configured to receive and/or transmit the data of the first reference number via the data port of the data protocol.

7. A method for adjusting at least one parameter of a data transmission of a control unit for a vehicle, the control unit having an interface for exchange of data from a sensor or an actuator with a processing unit, a first list with multiple first reference numbers being stored in a data memory of the control unit, at least one datum of a sensor and/or an actuator being allocated to each of the first reference numbers, and a second list with second reference numbers being stored in the data memory, at least one parameter of a predefined data transmission or data monitoring being allocated to the second reference numbers, the method comprising:
allocating a first reference number of the first reference numbers to a second reference number of the second reference numbers upon receipt of a predefined control command; and
receiving the data of the first reference number and/or transmitting the data of the first reference number in accordance with the predefined data transmission of the allocated second reference number, wherein:
each of the first reference number represents a data port at which the control unit transmits the data in a data protocol, and
the first reference number has a data accuracy.

8. The method as recited in claim 7, wherein upon the receipt of a control command in the form of a predefined diagnosis command, an allocation between a first reference number of the first reference numbers and a second reference number of the second reference numbers is implemented or modified.

9. The method as recited in claim 7, wherein the predefined data transmission of each of the second reference numbers has at least one of the following features: a network, and/or a frame ID, and/or a frame start bit, and/or a network type, and/or a network resolution.

10. The method as recited in claim 7, wherein each of the first reference numbers has at least one of the following features: a transmission direction, and/or a data type, and/or a data name, and/or a data accuracy.

11. The method as recited in claim 7, wherein the first reference numbers and the data and/or signals allocated to the first reference numbers are stored without the possibility of being modified via received control commands, and the second reference numbers are stored in a modifiable manner via received control signals.

12. The method as recited in claim 7, wherein the data and/or signals of the first reference number of the first reference numbers are received and/or transmitted via the data port of the data protocol.

13. A non-transitory computer-readable storage medium on which is stored a computer including commands for adjusting at least one parameter of a data transmission of a control unit for a vehicle, the control unit having an interface for exchange of data from a sensor or an actuator with a processing unit, a first list with multiple first reference numbers being stored in a data memory of the control unit, at least one datum of a sensor and/or an actuator being allocated to each of the first reference numbers, and a second list with second reference numbers being stored in the data memory, at least one parameter of a predefined data transmission or data monitoring being allocated to the second reference numbers, the commands, when executed by a computer, causing the computer to perform:

allocating a first reference number of the first reference numbers to a second reference number of the second reference numbers upon receipt of a predefined control command; and receiving the data of the first reference number and/or transmitting the data of the first reference number in accordance with the predefined data transmission of the allocated second reference number, wherein:

the first reference number represents a data port at which the control unit transmits the data in a data protocol, and the first reference number has a data accuracy.

\* \* \* \* \*